May 4, 1926.

H. S. OSBORNE

SIGNAL DETECTING SYSTEM

Filed Nov. 16, 1920

2 Sheets-Sheet 1

INVENTOR
H. S. Osborne
BY
ATTORNEY

Patented May 4, 1926.

1,583,004

UNITED STATES PATENT OFFICE.

HAROLD S. OSBORNE, OF MONTCLAIR, NEW JERSEY, ASSIGNOR TO AMERICAN TELEPHONE AND TELEGRAPH COMPANY, A CORPORATION OF NEW YORK.

SIGNAL-DETECTING SYSTEM.

Application filed November 16, 1920. Serial No. 424,506.

*To all whom it may concern:*

Be it known that I, HAROLD S. OSBORNE, a citizen of the United States, residing at Montclair, in the county of Essex and State of New Jersey, have invented certain Improvements in Signal-Detecting Systems, of which the following is a specification.

This invention relates to signal detecting systems, and especially to inductive means for detecting signals transmitted over cable circuits.

Experience has shown that it is often desirable to tap the circuits in a cable without conductively connecting the tapping device to the circuit carrying the signals that it is desired to detect. The desirability of such mode of connection is predicated not only on the ground of secrecy but also on the ground of efficiency, since identifying a predetermined cable without opening the said cable, is often very important.

It is one of the objects of this invention to detect signals in cables, especially those of the submarine telegraph type, without interrupting the service over the said cables. Another object of this invention is to facilitate communication between a cable ship and the shore station over a submarine cable, without cutting the cable. Another object of this invention consists in providing means whereby the signals transmitted over a cable and detected at a certain point thereon may be recorded at a point remote from the place where the signals are detected. Another object of this invention consists in providing means for detecting telephone conversations transmitted over submarine telephone cables, especially those of the four-wire type, comprising two side circuits and a phantom circuit.

Figure 1:
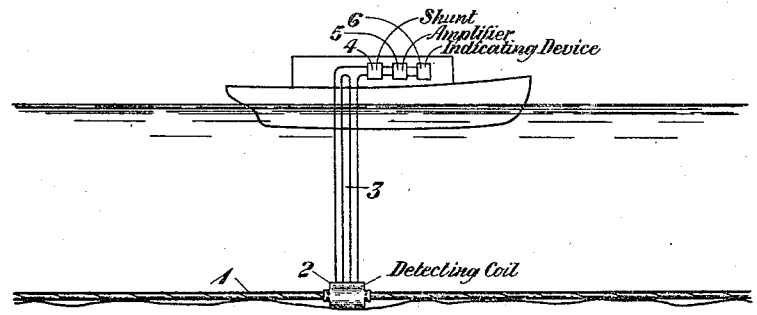
Figure 2:
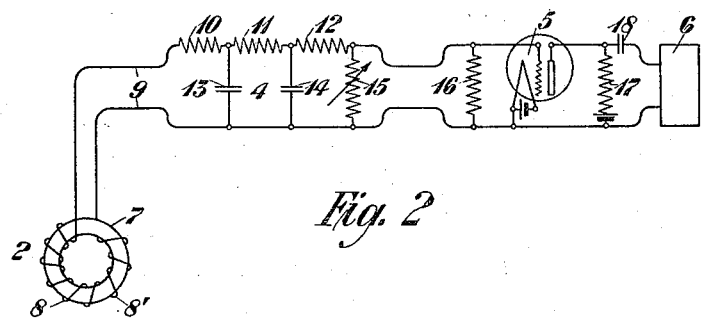
Figure 3:
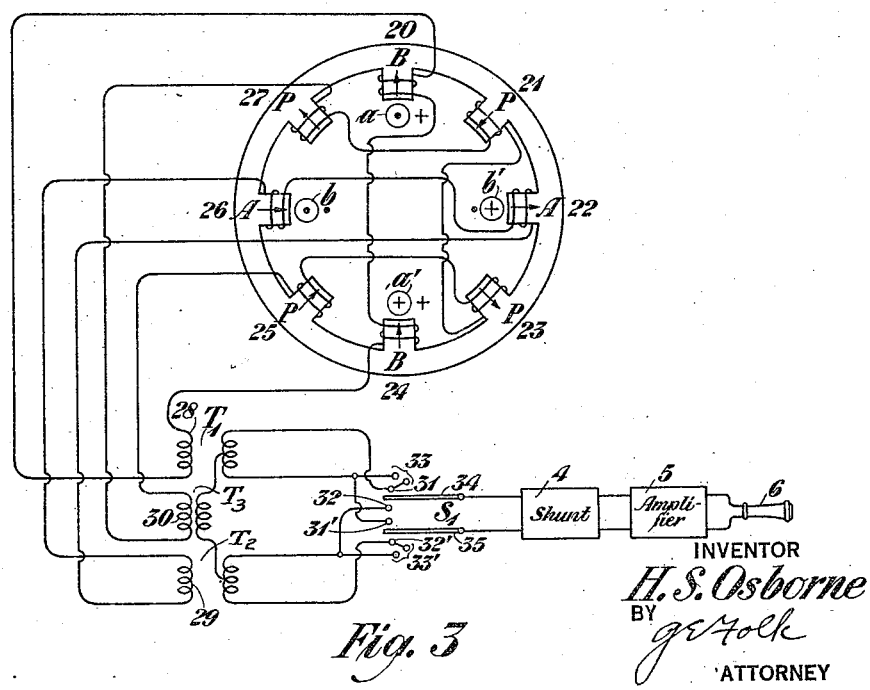

This invention will be clearly understood from the following description when read in connection with the attached drawing, of which Figure 1 shows in general the arrangement of a system for signal detection; Figure 2 shows schematically the circuit of such arrangement; Figure 3 shows the form of coil used to detect signals over a four-wire telephone circuit, the said coil having polar windings; and Figure 4 shows the same coil equipped with ring windings.

In Figure 1, 1 represents a submarine cable carrying signals that it is desired to detect and 2 represents a detecting coil which has been placed around the submarine cable for the detection of the signals. The placing of the coil on the cable may be effected either by raising the cable to the deck of a boat or in more shallow water through use of a diver. The type of detecting coil for the detection of telegraph signals may, for example, consist of a toroidal coil formed in two halves and adapted to be clamped around the core of the cable. Each half of the core contains a winding, the two windings being connected in series. These windings are connected by means of a well balanced cable 3, with a current controlling network 4 the output side of which is connected to an amplifier 5, which in turn is connected to an indicating or recording device 6. These devices 4, 5 and 6 may be located upon a cable ship in close proximity to the point of attachment of the exploring coil to the cable, or at a point far remote from the said point of attachment of the exploring coil and connected with the said coil by means of a well balanced cable.

Figure 2 shows the detecting coil 2 comprising a core 7 which is split in two halves to facilitate its application to the cable and having its windings 8 and 8' connected together in series. These windings are connected through the conductors 9 with the current controlling network 4. The network 4 comprises a plurality of resistances 10, 11 and 12 in series, and condensers 13 and 14 bridged across the two sides of the line. A shunt 15 preferably variable is also bridged across the circuit and the entire network functions to control the input to the amplifier 5, and to produce a desirable distortion in the shape of the recorded signals. 5 represents an amplifier of the well known therminoic type having bridged across its input side a high resistance 16, and across its output side a second resistance 17. Although a single amplifier is shown, it is to be understood that as many stages may be used as are necessary in order to produce the required degree of amplification. Furthermore, the invention is not limited to the use of a particular type of amplifier, such as that disclosed, but any type may be used which is adapted to produce substantially distortionless amplification. The output side of the amplifier is connected with an indicating or recording device such as an undulator or siphon recorder.

Figure 4:
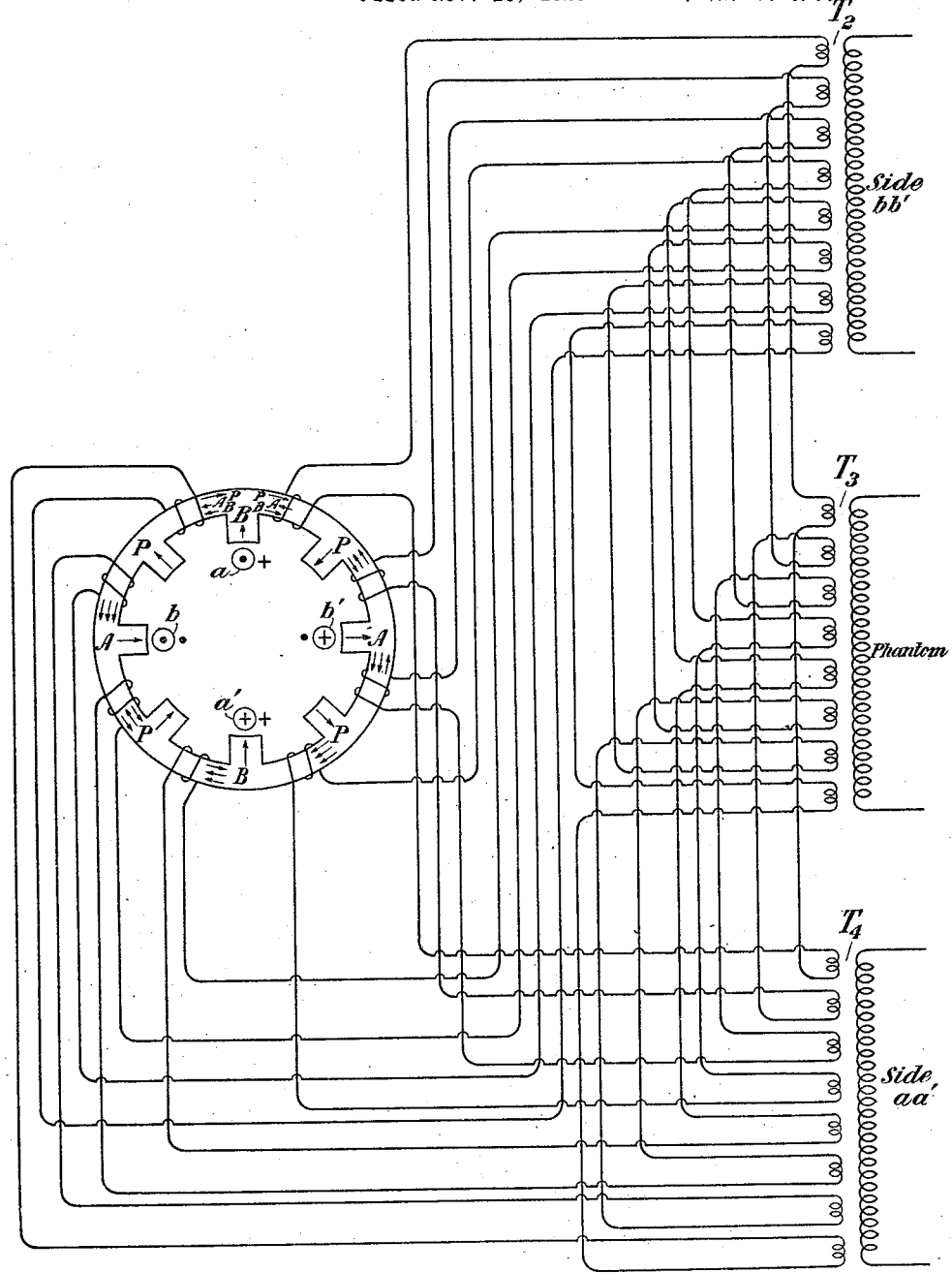

Figures 3 and 4 show two arrangements of the windings upon the core of a device adapted to detect signals transmitted over four-wire telephone cables. Since such cables are adapted to transmit simultaneously three telephone conversations, it is necessary to provide eight poles in order to pick up the flux resulting from the currents of the two side circuits and from the phantom circuit. In Figures 3 and 4, these poles, numbered 20 to 27 inclusive, are represented as salient poles, but they need not be so in actual practice. In Figure 3, each of the poles has thereon a winding, which windings are so connected together and with a common transforming arrangement as to enable the detection of signals transmitted over the circuits within the said core. These circuits are represented by the conductors $a$, $a'$ and $b$, $b'$, $a$, $a'$ representing one side circuit and $b$, $b'$ representing the other side circuit. The direction of flow of the side circuit currents in the respective conductors is shown by the dots and crosses within the circles of the conductors themselves. The direction of flow of the phantom circuit currents is indicated by the dots and crosses without the circles of the conductors. Thus the side circuit currents in conductors $a$, $a'$ will cause flux in the poles 22 and 26 in the direction indicated by the arrows. The side circuit current in conductors $b$, $b'$ will produce flux in poles 20 and 24 in the direction shown and the phantom circuit current over the said conductors will produce flux in poles 21, 23, 25 and 27 in the direction shown by the arrows. The windings of poles 20 and 24 are indicated in series with the winding 28 of the transformer $T_1$. The windings of poles 22 and 26 are indicated in series with the winding 29 of the transformer $T_2$ and the windings of the remaining poles are likewise connected in series with the winding 30 of the transformer $T_3$. The current induced in these windings will induce corresponding voltages in the secondary windings of the transformers, which are in turn connected with a switching device $S_1$, the arms of which move independently of each other. Thus, if the arms 34 and 35 are moved to contacts 31 and 31' respectively, the current from the side circuit $b$, $b'$ will be impressed upon the shunt 4, the amplifier 5 and finally indicated or recorded by the device 6. If the arms 34 and 35 be moved to the contacts 32 and 32', the current from the side circuit $a$, $a'$ will be impressed upon the terminal apparatus, and finally, if the arm 34 be moved to the contacts 33 and arm 35 be moved to the contacts 33', the detected signals over the phantom circuit will be impressed upon the terminal apparatus.

Having in mind the foregoing description of the parts of the apparatus shown in the four figures, the invention will be clearly understood from the following description of its mode of operation.

When signals are sent through a cable having a ground return, as for instance a submarine telegraph cable, all of the returning current does not flow in the armor wires of the cable or in the thin layer of water immediately surrounding it, because of the low resistance of sea water, and an appreciable part of the return current flows through water at varying distances away from the cable. When the detecting coil is placed around a cable, some of the return current flows outside of the coil and this part of the signal current sets up a magnetic flux in the core of the detecting coil. The voltage induced by this flux is of course, extremely small, and it would be impracticable to operate a recording device such as an undulator by means of the current set up by the said voltage. By combining an amplifier that is substantialy distortionless with the said detecting coil and undulator, it is practicable to magnify greatly the impulses in the coil winding so that the current from the amplifier will record easily legible signals on the said undulator. The amplifier and the recording apparatus need not remain in the immediate vicinity of the point where the cable has been tapped, but they may be separated by as great a distance as 50 or 100 miles if connected by an efficient and well balanced twin conductor cable. As is well known, the current strength of the transmitted signals is much greater near the end from which they are being transmitted than at some point more remote from the end, Consequently, the detected signals will be much stronger near the shore end of the cable than at a more remote point, and likewise the wave shape of the signals will be different at the more remote point than they are near the shore end of the cable. In order to control the magnitude of the signals impressed upon the amplifier and also to correct for distortion, there has been provided a network 4 which is inserted in the circuit between the detecting coil and the amplifier. It will be seen from the foregoing that this invention covers broadly an arrangement for detecting electrical signals, for amplifying and recording the same and for controlling and correcting the magnitude and the distortion respectively of the detected signals.

The method of using the arrangement shown in Figure 3 is briefly as follows: The core of the detecting coil is preferably made in two halves, which are placed about the cable and clamped together. The core is then oriented with reference to the conductors of the cable until it occupies a position substantially as shown in the figure. This is easily done experimentally by adjusting until each side circuit and the phantom is heard clearly in the receiver 6 in the respective position of the switching device $S_1$, with a minimum of crosstalk. The side circuit current flowing over the conductors $a, a'$ will set up in the core flux indicated by the arrows A which in turn will induce a current in the conductors connected with winding 29 of the transformer $T_2$. Similarly, the side circuit current in conductors $b, b'$ will set up in the core of the coil flux indicated by the arrows B, which induces current in the windings of the poles 20 and 24, thereby causing current to flow in the winding 28 of the transformer $T_1$. Similarly, the phantom current flowing over the conductors $a, a'$ and $b, b'$ will set up flux in the core indicated by the arrows P, which induces current in the windings of the phantom poles 21, 23, 25 and 27, which causes current to flow in winding 30 of the transformer $T_3$. As stated before the current in the primary windings of the transformers will induce potential in the secondary windings which may be detected by means of a suitable detecting device such as the telephone receiver 6, after being amplified by means of the amplifier 5.

The arrangement shown in Figure 4 shows a ring type of winding of the detecting coil. Each of the windings of this coil is connected in series with three primary windings also in series, each of said primary windings being associated with a separate secondary winding. Thus we have three separate transformers, one corresponding to the phantom circuit in the cable under detection, and the other two corresponding to the two side circuits. Each of the said transformers has eight primary windings which are connected with the windings of the detecting coil in the manner just described. It will be seen from the distribution of the flux in the core of the detecting coil and by the manner in which the ring windings of the said coil are connected with the primary windings of the three transformers that the flux set up by the side circuit $a, a'$ and by the phantom circuit will be neutralized with respect to transformer $T_2$ and consequently, there will be induced in the secondary of this transformer a voltage corresponding to the side circuit current of circuit $b, b'$. In like manner, only the phantom voltage will be induced in the secondary of transformer $T_3$, the flux resulting from the side circuit currents being neutralized with respect to the said transformer and correspondingly in the secondary of transformer $T_4$, we will obtain only the voltage resulting from the side circuit currents of circuit $a, a'$. The transformers $T_2$, $T_3$ and $T_4$ may be connected with similar terminal apparatus to that shown in Figure 3 by means of a similar switching device. It will be seen, therefore, that the arrangements shown in Figures 3 and 4 provide highly efficient means for detection of a plurality of telephone currents transmitted simultaneously over a cable without making direct connection with the conductors and for amplifying the said currents so that they may be readily understood.

Although this invention has been disclosed as having a particular form of embodiment, it is apparent that it is capable of other forms of embodiment than shown without departing from the spirit and scope of the appended claims.

What is claimed is:

1. The method for the simultaneous detection of three telephonic signals transmitted over a submarine cable which consists in encircling the said cable with a core having thereon a plurality of groups of windings, inducing in each group the current corresponding to one of the said telephonic signals, amplifying each of said induced currents and impressing the amplified current upon an indicating device.

2. In a signal detecting system the combination with a plurality of transmission circuits adapted to have signaling impulses transmitted thereover, of a detecting coil comprising a magnetic core encircling said transmission circuit and a plurality of groups of windings upon the said core, one group for each circuit, means for amplifying the current induced in each group of windings and means for registering the amplified currents.

3. In a signal detecting system the combination with a plurality of transmission circuits adapted to have signaling impulses transmitted thereover, of a detecting coil comprising a magnetic core encircling said transmission circuit and a plurality of groups of windings upon the said core, means for modifying the induced current in each group, means for amplifying the modified currents and means for registering the amplified currents.

4. In a signal detecting system the combination with a plurality of telephone circuits having voice currents imposed thereon, of a detecting coil comprising a magnetic core encircling the said circuit, the said core having a plurality of groups of windings thereon, each group adapted to have induced therein currents corresponding to the said voice current of its respective circuit, means for amplifying the said induced currents and means for registering the said amplified current.

5. In a signal detecting system the combination with a telephone cable comprising two physical circuits and a phantom circuit, of a detecting coil comprising a multi-poled magnetic core having windings on each pole the said core being so oriented with respect to the said circuit that current of each circuit will be induced in the windings of its respective poles, means for amplifying each of said induced currents, and means for registering the amplified currents.

6. In a signal detecting system the combination with a four-conductor telephone cable adapted to form two physical and one phantom circuit, of a detecting coil comprising an annular multi-poled magnetic core having a winding on each of said poles the said winding being so connected in groups that when the core is properly oriented with respect to the circuits current will be induced in the windings corresponding to the signaling current in the respective circuits.

In testimony whereof, I have signed my name to this specification this 15th day of November 1920.

HAROLD S. OSBORNE.